(12) United States Patent
Hallstrom et al.

(10) Patent No.: US 12,723,531 B2
(45) Date of Patent: Sep. 1, 2026

(54) CATALYZED SOOT FILTER WITH REDUCED AMMONIA OXIDATION

(71) Applicant: BASF MOBILE EMISSIONS CATALYSTS LLC, Iselin, NJ (US)

(72) Inventors: Kevin Hallstrom, Clinton, NJ (US); David Youngren, West Milford, NJ (US); Yuejin Li, Edison, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 0 days.

(21) Appl. No.: 17/935,179

(22) Filed: Sep. 26, 2022

(65) Prior Publication Data

US 2023/0027701 A1 Jan. 26, 2023

Related U.S. Application Data

(60) Division of application No. 16/869,622, filed on May 8, 2020, now Pat. No. 11,486,288, which is a (Continued)

(51) Int. Cl.
*F01N 3/28* (2006.01)
*B01D 53/94* (2006.01)
(Continued)

(52) U.S. Cl.
CPC .......... *F01N 3/28* (2013.01); *B01D 53/9418* (2013.01); *B01D 53/944* (2013.01); (Continued)

(58) Field of Classification Search
None
See application file for complete search history.

(56) References Cited

U.S. PATENT DOCUMENTS 4,518,710 A 5/1985 Brennan
5,137,855 A 8/1992 Hegedus et al.
(Continued)

FOREIGN PATENT DOCUMENTS

CN 105148981 A * 12/2015
JP 2012-215166 A 11/2012
(Continued)

OTHER PUBLICATIONS

Bao et al. CN10514981A—translated document (Year: 2015).*
(Continued)

*Primary Examiner* — Jelitza M Perez
(74) *Attorney, Agent, or Firm* — DLA Piper LLP (US)

(57) ABSTRACT

The present disclosure is directed to a system for treating an exhaust gas stream from an engine, which includes a diesel oxidation catalyst (DOC) located downstream of the engine and adapted for oxidation of hydrocarbons and carbon monoxide, an injector adapted for the addition of a reductant to the exhaust gas stream located downstream of the DOC, a catalyzed soot filter (CSF) located downstream of the injector, and a selective catalytic reduction component adapted for the oxidation of nitrogen oxides located downstream of the CSF. The CSF is adapted for oxidizing hydrocarbons and includes a selective oxidation catalyst composition on a filter with high selectivity ratio for hydrocarbon oxidation:ammonia oxidation (e.g., at least 0.6).

3 Claims, 5 Drawing Sheets

Related U.S. Application Data continuation of application No. PCT/IB2018/058787, filed on Nov. 8, 2018.

(60) Provisional application No. 62/584,341, filed on Nov. 10, 2017.

(51) Int. Cl.

| | |
|---|---|
| ***B01J 23/89*** | (2006.01) |
| ***B01J 29/76*** | (2006.01) |
| ***B01J 37/02*** | (2006.01) |
| ***F01N 3/035*** | (2006.01) |
| ***F01N 3/08*** | (2006.01) |
| ***F01N 3/20*** | (2006.01) |
| *B01J 35/56* | (2024.01) |

(52) U.S. Cl.

CPC ..... *B01D 53/9472* (2013.01); *B01D 53/9477* (2013.01); *B01J 23/8926* (2013.01); *B01J 29/763* (2013.01); *B01J 37/0201* (2013.01); *B01J 37/0215* (2013.01); *F01N 3/035* (2013.01); *F01N 3/0842* (2013.01); *F01N 3/2066* (2013.01); *B01D 2255/1023* (2013.01); *B01D 2255/20761* (2013.01); *B01D 2255/9155* (2013.01); *B01J 35/56* (2024.01); *F01N 2370/02* (2013.01); *F01N 2510/063* (2013.01); *F01N 2610/02* (2013.01); *F01N 2610/1453* (2013.01)

(56) References Cited

U.S. PATENT DOCUMENTS

| | | | | |
|---|---|---|---|---|
| 5,476,828 | A | 12/1995 | Kapteijn et al. | |
| 5,627,124 | A * | 5/1997 | Farrauto | B01J 37/0244 502/304 |
| 7,220,692 | B2 | 5/2007 | Marshall et al. | |
| 7,601,662 | B2 | 10/2009 | Bull et al. | |
| 8,038,954 | B2 | 10/2011 | Li | |
| 8,101,146 | B2 | 1/2012 | Fedeyko et al. | |
| 8,119,075 | B2 | 2/2012 | Dettling et al. | |
| 8,119,088 | B2 | 2/2012 | Boorse et al. | |
| 8,293,182 | B2 | 10/2012 | Boorse et al. | |
| 8,293,199 | B2 | 10/2012 | Beutel et al. | |
| 8,404,203 | B2 | 3/2013 | Bull et al. | |
| 8,524,182 | B2 | 9/2013 | Grubert et al. | |
| 8,685,882 | B2 | 4/2014 | Hong et al. | |
| 8,715,618 | B2 | 5/2014 | Trukhan et al. | |
| 8,802,016 | B2 | 8/2014 | Grubert | |
| 8,821,820 | B2 | 9/2014 | Seyler et al. | |
| 8,858,904 | B2 | 10/2014 | Punke et al. | |
| 9,011,807 | B2 | 4/2015 | Mohanan et al. | |
| 9,101,908 | B2 | 8/2015 | Jurng et al. | |
| 9,126,182 | B2 | 9/2015 | Deeba et al. | |
| 9,138,732 | B2 | 9/2015 | Bull et al. | |
| 9,162,218 | B2 | 10/2015 | Bull et al. | |
| 9,199,195 | B2 | 12/2015 | Andersen et al. | |
| 9,272,272 | B2 | 3/2016 | Trukhan et al. | |
| 9,321,009 | B2 | 4/2016 | Wan et al. | |
| 9,346,018 | B2 | 5/2016 | Johansen | |
| 9,352,307 | B2 | 5/2016 | Stiebels et al. | |
| 9,480,976 | B2 | 11/2016 | Rivas-Cardona et al. | |
| 9,616,384 | B2 | 4/2017 | Kalwei et al. | |
| 9,764,310 | B2 | 9/2017 | Markatou et al. | |
| 2001/0049339 | A1 | 12/2001 | Schafer-Sindlinger et al. | |
| 2007/0245724 | A1* | 10/2007 | Dubkov | B01D 53/944 60/299 |
| 2009/0084266 | A1* | 4/2009 | Yamada | B01J 37/024 96/135 |
| 2010/0092362 | A1 | 4/2010 | Li et al. | |
| 2011/0020204 | A1 | 1/2011 | Bull et al. | |
| 2011/0165051 | A1 | 7/2011 | Beutel et al. | |
| 2011/0274601 | A1 | 11/2011 | Boorse | |
| 2013/0195741 | A1* | 8/2013 | Deeba | B01J 23/14 502/340 |
| 2013/0302214 | A1* | 11/2013 | Pfeifer | F01N 3/035 422/168 |
| 2015/0033715 | A1* | 2/2015 | Markatou | B01J 23/44 502/262 |
| 2015/0231620 | A1 | 8/2015 | Montreuil | |
| 2018/0111089 | A1* | 4/2018 | Li | B01J 23/42 |

FOREIGN PATENT DOCUMENTS

| | | | | |
|---|---|---|---|---|
| WO | 2009/060599 | A1 | 5/2009 | |
| WO | 2009/141324 | A1 | 11/2009 | |
| WO | 2010/054034 | A2 | 5/2010 | |
| WO | WO-2016160988 | A1 * | 10/2016 | B01D 53/9418 |
| WO | WO-2017187344 | A1 * | 11/2017 | F01N 3/0842 |

OTHER PUBLICATIONS

Bao et al. CN105148981A—translated document (Year: 2015).*

European Search Report for EP Patent Application No. 18875123.4, Issued on Apr. 12, 2021, 3 pages.

International Search Report for PCT Patent Application No. PCT/IB2018/058787, Issued on Feb. 22, 2019, 5 pages.

Li, et al., "Selective NH3 oxidation to N2 in a wet stream", Applied Catalysis B: Environmental, vol. 13, Issue 2, Oct. 14, 1997, pp. 131-139.

* cited by examiner

CATALYZED SOOT FILTER WITH REDUCED AMMONIA OXIDATION

CROSS-REFERENCE TO RELATED APPLICATIONS

This application is a divisional application of U.S. Non-Provisional application Ser. No. 16/869,922, filed May 8, 2020, which is a continuation of International Application No. PCT/IB2018/058787; filed Nov. 8, 2018, which International Application was published by the International Bureau in English on May 16, 2019, and which claims priority to U.S. Provisional Application No. 62/584,341, filed Nov. 10, 2017, the content of each of which is hereby incorporated by reference in its entirety.

FIELD OF THE INVENTION

The present invention relates generally to the field of catalyzed soot filters and exhaust gas treatment systems including such filters, as well as to methods of preparing and using such filters and systems in the treatment of engine exhaust gas.

BACKGROUND OF THE INVENTION

Diesel engine exhaust is a heterogeneous mixture which contains not only gaseous emissions such as carbon monoxide ("CO"), unburned hydrocarbons ("HCs") and nitrogen oxides ("$NO_x$"), but also condensed phase materials, i.e. liquids and solids, which constitute the so-called particulates or particulate matter. Emission treatment systems for diesel engines must treat all of the components of the engine exhaust gas to meet the emission standards set by the various regulatory agencies throughout the world.

Common methods used to convert these engine exhaust gas components to harmless components include the use of a diesel oxidation catalyst (DOC), a selective catalytic reduction (SCR) catalyst, and a catalyzed soot filter (CSF). Diesel oxidation catalysts are placed in the exhaust gas stream of a diesel engine and typically contain platinum group metals (PGM), base metals, or a combination thereof. These catalysts promote the conversion of CO and HCs emissions to carbon dioxide and water. Selective catalytic reduction (SCR) catalysts are used to convert $NO_x$ to $N_2$ and typically comprise a base metal utilizing an ammonia reductant. The ammonia reductant is typically in the form of aqueous urea, which is injected in the engine exhaust gas stream downstream from the diesel oxidation catalyst and the catalyzed soot filter. After water vaporization and urea hydrolysis, the formed ammonia reacts with $NO_x$ in the engine exhaust gas stream on the SCR catalyst to form $N_2$. The ammonia reductant is typically injected into the engine exhaust gas stream before entering the SCR catalyst via a reductant delivery system. A catalyzed soot filter (CSF) collects soot or particulate matter from engine exhaust gas. Accumulated particulates are then combusted at elevated temperatures to regenerate the filter. Catalyst compositions deposited along the walls of the filter assist in the active and passive regeneration of the filter by promoting the combustion of the accumulated particulate matter. These catalyst compositions often contain PGM components as active catalyst components to ensure acceptable conversions of gaseous emissions such as HC and/or CO of the diesel exhaust to innocuous components (e.g., $CO_2$, $H_2O$).

A typical diesel engine exhaust gas treatment system for light and heavy duty applications may include the use of a DOC, CSF and SCR in the form of three separate units, each positioned downstream from the other in the engine exhaust gas stream, and an urea injector placed downstream of the CSF catalyst but upstream of the SCR catalyst. While such a system is efficient for meeting current emission regulations, in some vehicle applications, there is not enough space to install the urea injector before the SCR catalyst. In this case, the urea injector has to be placed in front of the CSF catalyst. Urea (or $NH_3$) going through a conventional CSF catalyst would result in $NH_3$ oxidation, rendering the downstream SCR catalyst ineffective. By placing a bare filter (without oxidation catalyst), one can avoid the premature $NH_3$ oxidation. However, this would require increasing the DOC catalyst volume to handle the additional hydrocarbon oxidation otherwise carried out on the CSF catalyst. Using an uncatalyzed filter also results in the release of high levels of CO and HC during filter regeneration as a byproduct of soot and fuel burning. Therefore, there is need to develop a CSF catalyst that can oxidize hydrocarbon while minimizing $NH_3$ oxidation. Such a CSF technology would allow us to place the urea injector in front of the CSF catalyst while maintaining the downstream SCR catalyst efficiency and at the same time without increasing the DOC volume.

SUMMARY OF THE INVENTION

The present invention relates to an engine exhaust gas treatment system comprising a diesel oxidation catalyst (DOC), a selective catalytic reduction (SCR) catalyst, a catalyzed soot filter (CSF), and a reductant injector located upstream of the CSF. The disclosed exhaust gas treatment system is designed, in particular, to accommodate vehicle applications where only a limited amount of space is available. Whereas in non-compact vehicle applications, the reductant injector is typically located downstream of the CSF (to avoid oxidation of reductant ammonia present in the exhaust gas stream, which is required for downstream SCR catalytic activity), the reductant injector in the disclosed exhaust gas treatment system is positioned upstream of the CSF to save space providing a smaller overall footprint of the engine treatment system. To prevent oxidation of ammonia present in the exhaust gas stream, the disclosed CSF comprises a selective oxidation catalyst composition disposed on a filter, designed to selectively oxidize hydrocarbons over ammonia.

One aspect of the invention relates to a system for treatment of an exhaust gas stream from an engine, the emission treatment system comprising a diesel oxidation catalyst located downstream of the engine and adapted for oxidation of hydrocarbons (HCs), carbon monoxide (CO) and nitric oxide (NO); an injector adapted for the addition of a reductant to the exhaust gas stream located downstream of the diesel oxidation catalyst; a catalyzed soot filter (CSF) comprising a selective oxidation catalyst composition on a filter, located downstream of the injector and adapted for oxidizing HCs with a selectivity ratio for HC oxidation: ammonia oxidation of at least 0.6 at a temperature of about 450° C. to about 550° C.; a selective catalytic reduction (SCR) component comprising a first SCR material adapted for the reduction of nitrogen oxides ($NO_x$), located downstream of the CSF; wherein all components are in fluid communication with the exhaust gas stream. In some embodiments, the selective oxidation catalyst composition comprises a base metal oxide component; a rare earth metal oxide component; a platinum group metal (PGM) component; or combinations thereof.

In some embodiments, the selective oxidation catalyst composition comprises a palladium component. In some embodiments, the selective oxidation catalyst composition is substantially free of platinum. In some embodiments, the selective oxidation catalyst composition comprises a PGM component and wherein the PGM component has a loading on the filter of about 0.1 g/ft$^3$ to about 10 g/ft$^3$. In some embodiments, the selective oxidation catalyst composition comprises a base metal oxide component selected from oxides of Cu, Fe, Ni, Zn, Al, Sn, W, Mo, Ta, Co, Bi, Ti, Zr, Sb, Mn, Be, Ge, V, Gd, Hf, In, Nb, Re, Ce, La, Pr, Nd and combinations thereof. In some embodiments, the base metal oxide component comprises copper oxide. In some embodiments, the selective oxidation catalyst composition comprises a base metal oxide component or a rare earth metal oxide component, with a loading of the selective oxidation catalyst composition on the filter of about 0.05 g/in$^3$ to about 0.5 g/in$^3$.

In some embodiments, the selective oxidation catalyst composition comprises a base metal oxide component, rare earth metal oxide component, PGM component or combinations thereof impregnated or ion-exchanged on a support material selected from the group consisting of a refractory metal oxide, an oxygen storage component, a molecular sieve, and a combination thereof. In some embodiments, the selective oxidation catalyst composition comprises a PGM component impregnated or ion-exchanged on a zeolite. In some embodiments, the support material is an oxygen storage component comprising ceria, zirconia, yttria, lanthana, neodymia, praseodymia, or a combination thereof. In some embodiments, the support material is a ceria-zirconia composite. In some embodiments, the ceria-zirconia composite comprises at least 10 wt. % ceria.

In some embodiments, the support material is a refractory metal oxide selected from alumina, silica, silica-alumina, titania, and combinations thereof. In some embodiments, the selective oxidation catalyst component comprises a palladium component impregnated on ceria.

In some embodiments, the selective oxidation catalyst composition comprises a rare earth metal oxide component selected from ceria, gadolinia, lanthana, neodymia, prascodymia, samaria, scandia, ytterbia, yttria, and combinations thereof. In some embodiments, the rare earth metal oxide component comprises ceria. In some embodiments, the selective oxidation catalyst composition comprises a ceria-zirconia composite comprising ceria in an amount of at least about 10% by weight of the composite. In some embodiments, the selective oxidation catalyst composition comprises copper oxide and ceria. In some embodiments, the selective oxidation catalyst composition has a loading of about 0.05 g/in$^3$ to about 0.5 g/in$^3$ on the filter.

In some embodiments, the CSF further comprises a second SCR material on the filter. In some embodiments, the selective oxidation catalyst composition and the second SCR material are mixed. In some embodiments, the selective oxidation catalyst composition and the second SCR material are disposed on the filter in an axially zoned configuration, wherein the selective oxidation catalyst composition is disposed upstream or downstream of the second SCR material. In some embodiments, the second SCR material has a loading of about 0.1 g/in$^3$ to about 1 g/in$^3$ on the filter.

In some embodiments, the first SCR material comprises a mixed metal oxide or a metal-promoted molecular sieve. In some embodiments, the first and second SCR material independently comprises a mixed metal oxide or a metal-promoted molecular sieve. In some embodiments, the metal-promoted molecular sieve is promoted with a metal selected from Cu, Co, Ni, La, Mn, Fe, V, Ag, Cc, Nd, Mo, Hf, Y, W, and combinations thereof. In some embodiments, the metal is present in an amount of about 0.1% to about 10% by weight based on the weight of the metal-promoted molecular sieve, calculated as metal oxide. In some embodiments, the metal-promoted molecular sieve is a zeolite with a structure type selected from AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, and UFI, and combinations thereof. In some embodiments, the second SCR material comprises a copper-promoted molecular sieve with structure type CHA. In some embodiments, the mixed metal oxide is selected from $Fe_2O_3/TiO_2$, $Fe_2O_3/Al_2O_3$, $MgO/TiO_2$, $MgO/Al_2O_3$, $MnO_x/TiO_2$, $CuO/TiO_2$, $CeO_2/ZrO_2$, $TiO_2/ZrO_2$, $V_2O_5/TiO_2$, $V_2O_5/WO_3/TiO_2$, $V_2O_5/SiO_2/TiO_2$, and mixtures thereof.

In some embodiments, the catalyzed soot filter is located immediately downstream of the injector. In some embodiments, the disclosed system further comprises a selective catalytic reduction catalyst/ammonia oxidation catalyst (SCR/AMOx) component located downstream of the SCR component. In some embodiments, the engine is a diesel engine. In some embodiments, the reductant comprises ammonia or an ammonia precursor. In some embodiments, the reductant comprises urea.

Another aspect of the invention relates to a catalyzed soot filter (CSF) comprising a selective oxidation catalyst composition on a filter, wherein the selective oxidation catalyst composition has a selectivity for oxidizing HC verses oxidizing ammonia, and wherein the selective oxidation catalyst composition is substantially free of platinum. In some embodiments, the selectivity is defined by a ratio of HC oxidation to ammonia oxidation ratio of at least 0.6 at a temperature of about 450° C. to about 550° C. In some embodiments, the selective oxidation catalyst composition comprises a base metal oxide component; a rare earth metal oxide component; a platinum group metal (PGM) component; or combinations thereof. In some embodiments, the base metal oxide component, rare earth metal oxide component, PGM component or combination thereof is impregnated or ion-exchanged on a support material selected from the group consisting of a refractory metal oxide, an oxygen storage component, a molecular sieve, and a combination thereof. In some embodiments, the selective oxidation catalyst composition comprises a palladium component. In some embodiments, the palladium component is impregnated on ceria or silica-alumina. In some embodiments, the selective oxidation catalyst composition comprises a PGM component and wherein the PGM component has a loading on the filter of about 0.1 g/ft$^3$ to about 10 g/ft$^3$. In some embodiments, the selective oxidation catalyst composition has a loading of about 0.05 g/in$^3$ to about 0.5 g/in$^3$ on the filter.

Another aspect of the invention relates to a method for reducing HCs, CO, and $NO_x$ present in an exhaust gas stream, comprising routing the exhaust gas stream through the disclosed system for a time and temperature sufficient to reduce HCs, CO, and $NO_x$ in the exhaust gas stream. In some embodiments, the method for reducing HCs, CO, and $NO_x$ present in an exhaust gas stream comprises contacting the exhaust gas stream with a diesel oxidation catalyst adapted for the oxidation of HCs, CO and NO, thereby forming a first effluent with reduced levels of HCs and CO and elevated levels of $NO_2$; injecting a reductant into the first effluent exiting the diesel oxidation catalyst to obtain a second effluent; contacting the second effluent with a catalyzed soot filter (CSF) comprising a selective oxidation catalyst on a filter, adapted for selectively oxidizing HCs with a selectivity ratio of HC oxidation:ammonia oxidation of at least 0.6 at a temperature of about 450° C. to about 550° C., forming a third effluent with further reduced levels of HCs; and contacting the third effluent with a SCR component adapted for the reduction of $NO_x$, thereby forming a treated exhaust gas stream with reduced levels of HCs, CO, and $NO_x$. In some embodiments, the treated exhaust gas stream has a HC content that is reduced by at least 35% at 450° C. with respect to the exhaust gas stream. In some embodiments, the treated exhaust gas stream has a HC content that is reduced by at least 55% at 500° C. with respect to the exhaust gas stream. In some embodiments, the treated exhaust gas stream has a HC content that is reduced by at least 75% at 550° C. with respect to the exhaust gas stream.

The present disclosure includes, without limitation, the following embodiments.

Embodiment 1. A system for treatment of an exhaust gas stream from an engine, the emission treatment system comprising a diesel oxidation catalyst located downstream of the engine and adapted for oxidation of hydrocarbons (HCs), carbon monoxide (CO) and nitric oxide (NO); an injector adapted for the addition of a reductant to the exhaust gas stream located downstream of the diesel oxidation catalyst; a catalyzed soot filter (CSF) comprising a selective oxidation catalyst composition on a filter, located downstream of the injector and adapted for oxidizing HCs with a selectivity ratio for HC oxidation:ammonia oxidation of at least 0.6 at a temperature of about 450° C. to about 550° C.; a selective catalytic reduction (SCR) component comprising a first SCR material adapted for the reduction of nitrogen oxides ($NO_x$), located downstream of the CSF; wherein all components are in fluid communication with the exhaust gas stream.

Embodiment 2. The system of the preceding embodiment, wherein the selective oxidation catalyst composition comprises: a base metal oxide component; a rare earth metal oxide component; a platinum group metal (PGM) component; or combinations thereof.

Embodiment 3. The system of any preceding embodiment, wherein the selective oxidation catalyst composition comprises a palladium component.

Embodiment 4. The system of any preceding embodiment, wherein the selective oxidation catalyst composition is substantially free of platinum.

Embodiment 5. The system of any preceding embodiment, wherein the selective oxidation catalyst composition comprises a PGM component and wherein the PGM component has a loading on the filter of about 0.1 $g/ft^3$ to about 10 $g/ft^3$.

Embodiment 6. The system of any preceding embodiment, wherein the selective oxidation catalyst composition comprises a base metal oxide component selected from oxides of Cu, Fe, Ni, Zn, Al, Sn, W, Mo, Ta, Co, Bi, Ti, Zr, Sb, Mn, Be, Ge, V, Gd, Hf, In, Nb, Re, Ce, La, Pr, Nd and combinations thereof.

Embodiment 7. The system of any preceding embodiment, wherein the base metal oxide component comprises copper oxide.

Embodiment 8. The system of any preceding embodiment, wherein the selective oxidation catalyst composition comprises a base metal oxide component or a rare earth metal oxide component, with a loading of the selective oxidation catalyst composition on the filter of about 0.05 $g/in^3$ to about 0.5 $g/in^3$.

Embodiment 9. The system of any preceding embodiment, wherein the selective oxidation catalyst composition comprises a base metal oxide component, rare earth metal oxide component, PGM component or combinations thereof impregnated or ion-exchanged on a support material selected from the group consisting of a refractory metal oxide, an oxygen storage component, a molecular sieve, and a combination thereof.

Embodiment 10. The system of any preceding embodiment, wherein the selective oxidation catalyst composition comprises a PGM component impregnated or ion-exchanged on a zeolite.

Embodiment 11. The system of any preceding embodiment, wherein the support material is an oxygen storage component comprising ceria, zirconia, yttria, lanthana, neodymia, praseodymia, or a combination thereof.

Embodiment 12. The system of any preceding embodiment, wherein the support material is a ceria-zirconia composite.

Embodiment 13. The system of any preceding embodiment, wherein the ceria-zirconia composite comprises at least 10 wt. % ceria.

Embodiment 14. The system of any preceding embodiment, wherein the support material is a refractory metal oxide selected from alumina, silica, silica-alumina, titania, and combinations thereof.

Embodiment 15. The system of any preceding embodiment, wherein the selective oxidation catalyst component comprises a palladium component impregnated on ceria.

Embodiment 16. The system of any preceding embodiment, wherein the selective oxidation catalyst composition comprises a rare earth metal oxide component selected from ceria, gadolinia, lanthana, neodymia, praseodymia, samaria, scandia, ytterbia, yttria, and combinations thereof.

Embodiment 17. The system of any preceding embodiment, wherein the rare earth metal oxide component comprises ceria.

Embodiment 18. The system of any preceding embodiment, wherein the selective oxidation catalyst composition comprises a ceria-zirconia composite comprising ceria in an amount of at least about 10% by weight of the composite.

Embodiment 19. The system of any preceding embodiment, wherein the selective oxidation catalyst composition comprises copper oxide and ceria.

Embodiment 20. The system of any preceding embodiment, wherein the selective oxidation catalyst composition has a loading of about 0.05 $g/in^3$ to about 0.5 $g/in^3$ on the filter.

Embodiment 21. The system of any preceding embodiment, wherein the CSF further comprises a second SCR material on the filter.

Embodiment 22. The system of any preceding embodiment, wherein the selective oxidation catalyst composition and the second SCR material are mixed.

Embodiment 23. The system of any preceding embodiment, wherein the selective oxidation catalyst composition and the second SCR material are disposed on the filter in an axially zoned configuration, wherein the selective oxidation catalyst composition is disposed upstream or downstream of the second SCR material.

Embodiment 24. The system of any preceding embodiment, wherein the second SCR material has a loading of about 0.1 $g/in^3$ to about 1 $g/in^3$ on the filter.

Embodiment 25. The system of any preceding embodiment, wherein the first SCR material comprises a mixed metal oxide or a metal-promoted molecular sieve.

Embodiment 26. The system of any preceding embodiment, wherein the first and second SCR material independently comprise a mixed metal oxide or a metal-promoted molecular sieve.

Embodiment 27. The system of any preceding embodiment, wherein the metal-promoted molecular sieve is promoted with a metal selected from Cu, Co, Ni, La, Mn, Fe, V, Ag, Ce, Nd, Mo, Hf, Y, W, and combinations thereof.

Embodiment 28. The system of any preceding embodiment, wherein the metal is present in an amount of about 0.1% to about 10% by weight based on the weight of the metal-promoted molecular sieve, calculated as metal oxide.

Embodiment 29. The system of any preceding embodiment, wherein the metal-promoted molecular sieve is a zeolite with a structure type selected from AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, and UFT, and combinations thereof.

Embodiment 30. The system of any preceding embodiment, wherein the second SCR material comprises a copper-promoted molecular sieve with structure type CHA.

Embodiment 31. The system of any preceding embodiment, wherein the mixed metal oxide is selected from $Fe_2O_3/TiO_2$, $Fe_2O_3/Al_2O_3$, $MgO/TiO_2$, $MgO/Al_2O_3$, $MnO_x/TiO_2$, $CuO/TiO_2$, $CeO_2/ZrO_2$, $TiO_2/ZrO_2$, $V_2O_5/TiO_2$, $V_2O_5/WO_3/TiO_2$, $V_2O_5/SiO_2/TiO_2$, and mixtures thereof.

Embodiment 32. The system of any preceding embodiment, wherein the catalyzed soot filter is located immediately downstream of the injector.

Embodiment 33. The system of any preceding embodiment, further comprising a selective catalytic reduction catalyst/ammonia oxidation catalyst (SCR/AMOx) component located downstream of the SCR component.

Embodiment 34. The system of any preceding embodiment, wherein the engine is a diesel engine.

Embodiment 35. The system of any preceding embodiment, wherein the reductant comprises ammonia or an ammonia precursor.

Embodiment 36. The system of any preceding embodiment, wherein the reductant comprises urea.

Embodiment 37. A catalyzed soot filter (CSF) comprising a selective oxidation catalyst composition on a filter, wherein the selective oxidation catalyst composition has a selectivity for oxidizing HC versus oxidizing ammonia, and wherein the selective oxidation catalyst composition is substantially free of platinum.

Embodiment 38. The CSF of the preceding embodiment, wherein the selectivity is defined by a ratio of HC oxidation to ammonia oxidation ratio of at least 0.6 at a temperature of about 450° C. to about 550° C.

Embodiment 39. The CSF of any preceding embodiment, wherein the selective oxidation catalyst composition comprises a base metal oxide component; a rare earth metal oxide component; a platinum group metal (PGM) component; or combinations thereof.

Embodiment 40. The CSF of any preceding embodiment, wherein the base metal oxide component, rare earth metal oxide component, PGM component or combination thereof is impregnated or ion-exchanged on a support material selected from the group consisting of a refractory metal oxide, an oxygen storage component, a molecular sieve, and a combination thereof.

Embodiment 41. The CSF of any preceding embodiment, wherein the selective oxidation catalyst composition comprises a palladium component.

Embodiment 42. The CSF of any preceding embodiment, wherein the palladium component is impregnated on ceria or silica-alumina.

Embodiment 43. The CSF of any preceding embodiment, wherein the selective oxidation catalyst composition comprises a PGM component and wherein the PGM component has a loading on the filter of about 0.1 $g/ft^3$ to about 10 $g/ft^3$.

Embodiment 44. The CSF of any preceding embodiment, wherein the selective oxidation catalyst composition has a loading of about 0.05 $g/in^3$ to about 0.5 $g/in^3$ on the filter.

Embodiment 45. A method for reducing HCs, CO, and $NO_x$ present in an exhaust gas stream, comprising routing the exhaust gas stream through the system of any preceding embodiment for a time and temperature sufficient to reduce HCs, CO, and $NO_x$ in the exhaust gas stream.

Embodiment 46. A method for reducing HCs, CO, and $NO_x$ present in an exhaust gas stream comprising contacting the exhaust gas stream with a diesel oxidation catalyst adapted for the oxidation of HCs, CO and NO, thereby forming a first effluent with reduced levels of HCs and CO and elevated levels of $NO_2$; injecting a reductant into the first effluent exiting the diesel oxidation catalyst to obtain a second effluent; contacting the second effluent with a catalyzed soot filter (CSF) comprising a selective oxidation catalyst on a filter, adapted for selectively oxidizing HCs with a selectivity ratio of HC oxidation:ammonia oxidation of at least 0.6 at a temperature of about 450° C. to about 550° C., forming a third effluent with further reduced levels of HCs; and contacting the third effluent with a SCR component adapted for the reduction of $NO_x$, thereby forming a treated exhaust gas stream with reduced levels of HCs, CO, and $NO_x$.

Embodiment 47. The method of any preceding embodiment, wherein the treated exhaust gas stream has a HC content that is reduced by at least 35% at 450° C. with respect to the exhaust gas stream.

Embodiment 48. The method of any preceding embodiment, wherein the treated exhaust gas stream has a HC content that is reduced by at least 55% at 500° C. with respect to the exhaust gas stream.

Embodiment 49. The method of any preceding embodiment, wherein the treated exhaust gas stream has a HC content that is reduced by at least 75% at 550° C. with respect to the exhaust gas stream.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE PREFERRED EMBODIMENTS

Figure 1:
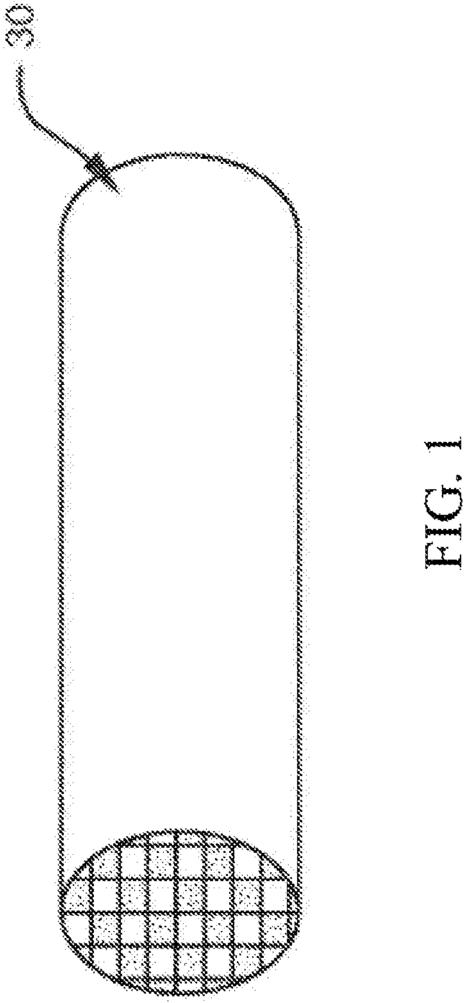
FIG. 1 is a perspective view of a wall-flow filter substrate.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The current invention relates to an exhaust gas treatment system comprising a diesel oxidation catalyst (DOC), a catalyzed soot filter (CSF), a selective catalytic reduction (SCR) catalyst, and a reductant injector located upstream of the CSF. The CSF comprises a selective oxidation catalyst composition disposed on a filter, wherein the selective oxidation catalyst composition is adapted to oxidize hydrocarbons with a high selectivity ratio for hydrocarbon oxidation:ammonia oxidation.

Typically, in exhaust gas treatment systems comprising the aforementioned catalytic components (DOC, CSF, and SCR catalyst), the reductant injector needed to promote the SCR reaction ($NO_x$ conversion) is positioned downstream of the CSF to prevent oxidation of the reductant, e.g., ammonia, by the CSF before it reaches the SCR catalyst. Oxidation of ammonia by the CSF reduces the amount of ammonia available for the SCR catalyst to convert $NO_x$ and thus decreases the catalytic activity of the SCR catalyst. Alternatively, in certain systems, the reductant injector is upstream of the CSF, but the soot filter is uncatalyzed (i.e., has no oxidation catalyst composition coated thereon) such that no oxidation of ammonia occurs over the soot filter. However, an increase in carbon monoxide and hydrocarbon slip during the regeneration process of such uncatalyzed soot filters is often observed.

In general, regeneration of catalyzed soot filters oxidizes, burns, and/or converts the trapped solid particles in the filter to harmless, gaseous carbon dioxide ($CO_2$) and water vapor ($H_2O$) and proceeds in an active and/or passive manner. Active regeneration typically requires the addition of heat to the exhaust gas to increase the temperature of the soot to a point at which it will oxidize in the presence of excess oxygen in the exhaust gas stream. Excess diesel fuel (used as a hydrocarbon source) may be injected into the exhaust gas stream through a fuel injector located upstream of the CSF and DOC. The excess diesel fuel can be oxidized over the DOC as a means of increasing the CSF temperature and any remaining diesel fuel not oxidized by the DOC is typically oxidized by the CSF. However, in engine gas treatment systems where the soot filter is uncatalyzed, the DOC has to compensate for the lack of oxidation activity of the uncatalyzed soot filter to minimize the amount of remaining diesel fuel present in the exhaust gas stream exiting the DOC (which is referred to as hydrocarbon slip). Passive regeneration does not require additional energy and relies on the oxidation of soot in the presence of $NO_2$ at temperatures achieved during normal engine operation.

Positioning the reductant injector upstream of a catalyzed soot filter as disclosed in the present application provides certain advantages, such as complying with space constraints of some vehicle applications. In general, flexibility in positioning catalyst components and injector ports is important, particularly within compact engine treatment systems for smaller vehicle footprints. The disclosed exhaust gas treatment system comprises a CSF that is designed to preferentially oxidize hydrocarbons over ammonia to ensure that sufficient ammonia is present to maintain efficient $NO_x$ conversion of a downstream SCR catalyst. This selectivity is achieved by employing a selective oxidation catalyst composition on the soot filter, as described more fully herein.

As used herein, the term "catalyst" or "catalyst composition" refers to a material that promotes a reaction.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a combustion engine, which may contain entrained non-gaseous components such as liquid droplets, solid particulates, and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen.

As used herein, the term "substrate" refers to the monolithic material onto which the catalyst composition is placed.

As used herein, the term "support" refers to any high surface area material, usually a metal oxide material, upon which a catalytic precious metal is applied.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. A washcoat is formed by preparing a slurry containing a certain solid content (e.g., 30%-90% by weight) of particles in a liquid vehicle, which is then coated onto a substrate and dried to provide a washcoat layer.

As used herein, the term "catalytic article" refers to an element that is used to promote a desired reaction. For example, a catalytic article may comprise a washcoat containing catalytic compositions on a substrate.

As used herein, "impregnated" or "impregnation" refers to permeation of the catalytic material into the porous structure of the support material.

The term "abatement" means a decrease in the amount, caused by any means.

Selective Oxidation Catalyst Composition

As noted above, the disclosed catalyzed soot filter comprises a selective oxidation catalyst composition on a filter. The selective oxidation catalyst composition comprises a base metal oxide component, a rare earth metal oxide component, a platinum group metal (PGM) component, or combinations thereof.

In some embodiments, the selective oxidation catalyst composition comprises a base metal oxide component. As used herein, "base metal oxide component" refers to oxides of base metals selected from copper, iron, nickel, zinc, aluminum, tin, tungsten, molybdenum, tantalum, cobalt, bismuth, titanium, zirconium, antimony, manganese, beryllium, germanium, vanadium, gadolinium, hafnium, indium, niobium, rhenium, cerium, lanthanum, praeseodynium, neodymium, and a combination thereof. In some embodiments, the base metal oxide component comprises copper oxide. Typically, the base metal oxide component is impregnated or ion-exchanged onto a support material. The amount of base metal oxide component can vary, but will typically be from about 0.05 wt. % to about 10 wt. %, from about 2 wt. % to about 8 wt. %, or from about 3 wt. % to about 6 wt. % (or less than about 10 wt. %, less than about 9 wt. %, less than about 8 wt. %, less than about 7 wt. %, less than about 6 wt. %, less than about 5 wt. %, less than about 4 wt. %, less than about 3 wt. %, less than about 2 wt. %, or less than about 1 wt. %), calculated as the oxide, based on the total weight of the support material with which it is associated.

In some embodiments, the base metal oxide component comprises one or more base metal oxides combined with oxides of metals selected from Group VIII, Group IIIB, rare earth metals, Group IVB, Group VB, Group VIB, Group IB, Group IIB, and a combination thereof. In some embodiments, one or more base metal oxides are combined with metal oxides selected from yttrium, lanthanum, cerium, pracscodymium, titanium, zirconium, vanadium, niobium, chromium, molybdenum tungsten, and a combination thereof.

Exemplary base metal oxide components are described in, for example, U.S. Pat. No. 9,616,384 to Kalwei et al.; and U.S. Pat. No. 9,126,182 to Deeba et al., which are hereby incorporated by reference in their entireties.

In some embodiments, the selective oxidation catalyst composition comprises a platinum group metal component. As used herein, "platinum group metal component" or "PGM component" refers to platinum group metals or oxides thereof, including platinum (Pt), palladium (Pd), ruthenium (Ru), rhodium (Rh), osmium (Os), iridium (Ir), and mixtures thereof. In some embodiments, the PGM component is a palladium component. In some embodiments, the PGM component is impregnated or ion-exchanged onto a support material. The amount of PGM component (e.g., Pd component) can vary, but will typically be from about 0.1 wt. % to about 10 wt. %, from about 1 wt. % to about 8 wt. %, or from about 3 wt. % to about 6 wt. % (or less than about 10 wt. %, about 9 wt. %, about 8 wt. %, about 7 wt. %, about 6 wt. %, about 5 wt. %, about 4 wt. %, about 3 wt. %, about 2 wt. %, or less than about 1 wt. %) relative to the weight of the support material with which it is associated.

In some embodiments, the selective oxidation catalyst composition is substantially free of platinum. As used herein, "substantially free of platinum" means that there is no platinum metal intentionally added to the selective oxidation catalyst composition, and that there is less than about 0.01% wt. of any additional platinum by weight present in the selective oxidation catalyst.

In some embodiments, the selective oxidation catalyst composition comprises a rare earth metal oxide component. As used herein, "rare earth metal oxide component" refers to one or more oxides of the lanthanum series defined in the Periodic Table of Elements, including lanthanum, cerium, gadolinium, samarium, scandium, ytterbium, yttrium, praseodymium and neodymium. In some embodiments, the rare earth metal oxide component comprises ceria. Typically, the rare earth metal component is impregnated or ion-exchanged on a support material. The amount of rare earth metal oxide component (e.g., ceria) can vary, but will typically be from about 0.1 wt. % to about 10 wt. %, from about 1 wt. % to about 8 wt. %, or from about 3 wt. % to about 6 wt. % (or less than about 10 wt. %, about 9 wt. %, about 8 wt. %, about 7 wt. %, about 6 wt. %, about 5 wt. %, about 4 wt. %, about 3 wt. %, about 2 wt. %, or less than about 1 wt. %) relative to the weight of the support material with which it is associated.

The metal component (i.e., base metal oxide component, PGM component, rare earth metal component, or combinations thereof) is typically supported on a support material, such as a molecular sieve, refractory metal oxide material, oxygen storage component, or a combination thereof. In some embodiments, the support material comprises a molecular sieve. As used herein, the term "molecular sieve" refers to framework materials such as zeolites and other framework materials (e.g., isomorphously substituted materials). Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. According to one or more embodiments, it will be appreciated that by defining the molecular sieves by their framework type, it is intended to include any and all zeolite or isotypic framework materials, such as SAPO, AlPO and MeAPO, Ge-silicates, all-silica, and similar materials having the same framework type.

Generally, molecular sieves, e.g., zeolites, are defined as aluminosilicates with open 3-dimensional framework structures composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

As used herein, the term "zeolite" refers to a specific example of a molecular sieve, including silicon and aluminum atoms. Zeolites are crystalline materials having rather uniform pore sizes which, depending upon the type of zeolite and the type and amount of cations included in the zeolite lattice, range from about 3 to 10 Angstroms in diameter. The molar ratio of silica to alumina (SAR) of zeolites, as well as other molecular sieves, can vary over a wide range, but is generally 2 or greater. In one or more embodiments, the molecular sieve has a SAR molar ratio in the range of about 2 to about 300, including about 5 to about 250, about 5 to about 200, about 5 to about 100, and about 5 to about 50. In one or more specific embodiments, the molecular sieve has a SAR molar ratio in the range of about 10 to about 200, about 10 to about 100, about 10 to about 75, about 10 to about 60, and about 10 to about 50, about 15 to about 100, about 15 to about 75, about 15 to about 60, and about 15 to about 50, about 20 to about 100, about 20 to about 75, about 20 to about 60, and about 20 to about 50.

In more specific embodiments, reference to an aluminosilicate zeolite framework type limits the material to molecular sieves that do not include phosphorus or other metals substituted in the framework. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates. The term "aluminophosphates" refers to another specific example of a molecular sieve, including aluminum and phosphate atoms. Aluminophosphates are crystalline materials having rather uniform pore sizes.

In one or more embodiments, the molecular sieve, comprises $SiO_4$/$AlO_4$ tetrahedra that are linked by common oxygen atoms to form a three-dimensional network. In other embodiments, the molecular sieve comprises $SiO_4$/$AlO_4$/$PO_4$ tetrahedra. The molecular sieve of one or more embodiments can be differentiated mainly according to the geometry of the voids which are formed by the rigid network of the $SiO_4$/$AlO_4$, or $SiO_4$/$AlO_4$/$PO_4$, tetrahedra. The entrances to the voids are formed from 6, 8, 10, or 12 ring atoms with respect to the atoms which form the entrance opening. In one or more embodiments, the molecular sieve comprises ring sizes of no larger than 12, including 6, 8, 10, and 12.

In one or more embodiments, the molecular sieve comprises an 8-ring small pore aluminosilicate zeolite. As used herein, the term "small pore" refers to pore openings which are smaller than about 5 Angstroms, for example on the order of ~3.8 Angstroms. The phrase "8-ring" zeolites refers to zeolites having 8-ring pore openings and double-six ring secondary building units and having a cage like structure resulting from the connection of double six-ring building units by 4 rings. In one or more embodiments, the molecular sieve is a small pore molecular sieve having a maximum ring size of eight tetrahedral atoms.

As noted above, in one or more embodiments, the molecular sieve can include all aluminosilicate, borosilicate, gallosilicate, MeAPSO, and MeAPO compositions. These include, but are not limited to SSZ-13, SSZ-62, natural chabazite, zeolite K-G, Linde D, Linde R, LZ-218, LZ-235, LZ-236, ZK-14, SAPO-34, SAPO-44, SAPO-47, ZYT-6, CuSAPO-34, CuSAPO-44, Ti-SAPO-34, and CuSAPO-47.

According to one or more embodiments, the molecular sieve can be based on the framework topology by which the structures are identified. Typically, any framework type of zeolite can be used, such as framework types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AVL, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EEI, EMT, EON, EPI, ERI, ESV, ETR, EUO, FAU, FER, FRA, GIS, GIU, GME, GON, GOO, HEU, IFR, IFY, IHW, IRN, ISV, ITE, ITH, ITW, IWR, IWW, JBW, KFI, LAU, LEV, LTO, LIT, LOS, LOV, LTA, LTL, LTN, MAR, MAZ, MEI, MEL, MEP, MER, MFT, MFS, MON, MOR, MOZ, MSO, MTF, MTN, MTT, MTW, MWF, MWW, NAB, NAT, NES, NON, NPO, NPT, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SFW, SGT, SOD, SOS, SSY, STF, STI, STT, TER, THO, TON, TSC, UEI, UFT, UOZ, UST, UTL, VET, VFI, VNI, VSV, WIE, WEN, YUG, ZON, or combinations thereof. In some embodiments, a molecular sieve comprises a framework structure type selected from AEI, AFT, AFV, AFX, AVL, CHA, DDR, EAB, EEI, EM, IFY, IRN, KFI, LEV, LTA, LTN, MER, MWF, NPT, PAU, RHO, RTE, RTH, SAS, SAT, SAV, SFW, TSC, and UFI. In some embodiments, the zeolite can be a natural or synthetic zeolite such as faujasite, chabazite, chnoptilolite, mordenite, silicalite, zeolite X, zeolite Y, ultrastable zeolite Y, ZSM-5, ZSM-12, SSZ-3, SAPO 5, offretite, or a beta zeolite.

Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolite structure types that have a d6r secondary building unit include AEI, AFT, AFX, CHA, EAB, EMT, EM, FAU, GME, JSR, KFI, LEV, LTL, LTN, MOZ, MSO, MWW, OFF, SAS, SAT, SAV, SBS, SBT, SFW, SSF, SZR, TSC, and WEN. In some embodiments, the zeolite support material comprises a d6r unit. In some embodiments, the zeolite support material has a structure type selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In some embodiments, the zeolite support material has a structure type selected from the group consisting of CHA, AEI, AFX, ERI, KFI, LEV, and combinations thereof. In specific embodiments, the zeolite support material has a structure type selected from CHA, AEI, and AFX. In specific embodiments, the zeolite support material has the CHA structure type.

In some embodiments, the support material comprises a refractory metal oxide material. As used herein, "refractory metal oxide material" refers to porous metal-containing oxide materials exhibiting chemical and physical stability at high temperatures, such as the temperatures associated with diesel engine exhaust. Exemplary refractory metal oxides include alumina, silica, zirconia, titania, ceria, and physical mixtures or chemical combinations thereof, including atomically-doped combinations and including high surface area or activated compounds such as activated alumina. In some embodiments, the refractory metal oxide material comprises silica, e.g., silica-alumina. In some embodiments, the refractory metal oxide material is modified with a metal oxide(s) of alkali, semimetal, and/or transition metal, e.g., La, Mg, Ba, Sr, Zr, Ti, Si, Ce, Mn, Nd, Pr, Sm, Nb, W, Y, Nd, Mo, Fe, or combinations thereof. In some embodiments, the amount of alkali, semimetal, and/or transition metal metal oxide(s) used to modify the refractory metal oxide material can range from about 0.5% to about 50% by weight based on the amount of refractory metal oxide material. Exemplary combinations of refractory metal oxide materials include alumina-zirconia, ceria-zirconia, alumina-ceria-zirconia, lanthana-alumina, lanthana-zirconia, lanthana-zirconia-alumina, baria-alumina, baria lanthana-alumina, baria lanthana-neodymia alumina, and alumina-ceria.

In some embodiments, high surface area refractory metal oxide materials are used, such as alumina support materials, also referred to as "gamma alumina" or "activated alumina," which typically exhibit a BET surface area in excess of 60 $m^2/g$, often up to about 200 $m^2/g$ or higher. "BET surface area" has its usual meaning of referring to the Brunauer, Emmett, Teller method for determining surface area by $N_2$ adsorption. In one or more embodiments, the BET surface area ranges from about 100 to about 150 $m^2/g$. Useful commercial alumina includes high surface area alumina, such as high bulk density gamma-alumina, and low or medium bulk density large pore gamma-alumina.

In some embodiments, the support material comprises an oxygen storage component (OSC). As used herein, "OSC" refers to an oxygen storage component that exhibits an oxygen storage capability and often is an entity that has multi-valent oxidation states and can actively react with oxidants such as oxygen ($O_2$) or nitric oxides ($NO_2$) under oxidative conditions, or can actively react with reductants such as carbon monoxide (CO), hydrocarbons (HC), or hydrogen ($H_2$) under reduction conditions. Certain exemplary OSCs comprise rare earth metal oxides, which are oxides of scandium, yttrium, and/or the lanthanum series defined in the Periodic Table of Elements. In some embodiments, OSCs include zirconium oxide ($ZrO_2$), ceria ($CeO_2$), titania ($TiO_2$), praseodymia ($Pr_6O_{11}$), yttria ($Y_2O_3$), neodymia ($Nd_2O_3$), lanthana ($La_2O_3$), gadolinium oxide ($Gd_2O_3$), and mixtures comprising at least two of the foregoing. In some embodiments, the OSC comprises ceria or zirconia. In some embodiments, the OSC comprises ceria in combination with one or more other materials including, for example, oxides of zirconium (Zr), titanium (Ta), lanthanum (La), praseodymium (Pr), neodymium (Nd), niobium (Nb), yttrium (Y), nickel (Ni), manganese (Mn), iron (Fe) copper (Cu), silver (Ag), gold (Au), samarium (Sm), gadolinium (Gd), and combinations comprising at least two of the foregoing metals. Such combinations may be referred to as mixed oxide composites. For example, a "ceria-zirconia composite" means a composite comprising ceria and zirconia, without specifying the amount of either component. Suitable ceria-zirconia composites include, but are not limited to, composites having a ceria content ranging from about 5% to about 95%, preferably from about 5% to about 75%, more preferably from about 10% to about 70% by weight based on the total weight of the ceria-zirconia composite (e.g., at least about 5%, at least about 10%, at least about 20%, at least 30%, at least 40%, at least 50%, at least 60%, at least 70%, at least 80%, at least 90%, or at least about 95% ceria).

In one specific embodiment, the selective oxidation catalyst composition comprises copper oxide supported on a zeolite, such as chabazite (CHA structure type). In another specific embodiment, the selective oxidation catalyst composition comprises copper oxide supported on an OSC, e.g, ceria. In a further embodiment, the selective oxidation catalyst composition comprises a palladium component impregnated or ion-exchanged into a refractory metal oxide component, e.g., silica-alumina. In another embodiment, the selective oxidation catalyst composition comprises a palladium component impregnated or ion-exchanged into an OSC component, e.g., ceria. In a still further specific embodiment, the selective oxidation catalyst composition comprises ceria supported on an OSC, e.g., zirconia or ceria.

The amount of the metal component (i.e., base metal oxide component, PGM component, rare earth metal oxide component) present in the selective oxidation catalyst composition can vary, but will typically be from about 0.1 wt. % to about 10 wt. %, from about 1 wt. % to about 8 wt. %, or from about 3 wt. % to about 6 wt. %, (or less than about 10 wt. %, less than about 9 wt. %, less than about 8 wt. %, less than about 7 wt. %, less than about 6 wt. %, less than about 5 wt. %, less than about 4 wt. %, less than about 3 wt. %, less than about 2 wt. %, or less than about 1 wt. %), calculated as the oxide, reported on a volatile-free basis, based on the total weight of the selective oxidation catalyst composition.

In some embodiments, the selective oxidation catalyst composition selectively oxidizes HCs with a selectivity ratio of HC oxidation:ammonia oxidation ranging from about 0.5 to about 2.0 (or at least about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, or about 2.0). In some embodiments, the exhibited selectivity ratios noted herein are at temperatures of, e.g., about 400° C. to about 600° C., or of about 450° C. to about 550° C. (or lower than about 600° C., or lower then about 550° C., or lower than about 540° C., or lower then about 530° C., or lower then about 520° C., or lower then about 510° C., or lower then about 500° C., or lower then about 490° C., or lower then about 480° C., or lower then about 470° C., or lower then about 460° C., or lower then about with 450° C. a lower boundary of about 400° C.

SCR Material

As noted above, the disclosed exhaust gas treatment system disclosed herein comprises a SCR catalyst containing a SCR material (referred to herein as a "first SCR material") and a soot filter catalyzed with a selective oxidation catalyst, which can optionally also comprise a SCR material (referred to herein as a "second SCR material"). The first and (optional) second SCR materials can independently comprise any material that is able to reduce $NO_x$. The first SCR material and the second SCR material, if present, can be the same or different. In some embodiments, the first and/or second SCR material comprises a mixed metal oxide component or a metal promoted molecular sieve. The term "mixed metal oxide component" refers to an oxide that contains cations of more than one chemical element or cations of a single element in several states of oxidation. In one or more embodiments, the mixed metal oxide is selected from $Fe_2O_3/TiO_2$, $Fe_2O_3/Al_2O_3$, $MgO/TiO_2$, $MgO/Al_2O_3$, $MnO/Al_2O_3$, $MnO/TiO_2$, $CuO/TiO_2$, $CeO_2/ZrO_2$, $TiO_2/ZrO_2$, $V_2O_5/TiO_2$, $V_2O_5/TiO_2/SiO_2$, and mixtures thereof. The mixed oxide can be a single phase chemical compound or a multi-phase physical or chemical mixture. In some embodiments, the single phase compound may be non-stoichiometric and the atomic composition of the mixed metal oxides is expressed with formulae containing uneven values (e.g., $Ce_xZr_yO_z$, wherein x, y, and z do not have to be whole numbers).

In some embodiments, the mixed metal oxide component comprises vanadia/titania. In some embodiments, the amount of vanadia present in the mixed metal oxide component ranges from about 1% to about 10% by weight based on the total weight of the mixed metal oxide component (no more than about 10%, about 9%, about 8%, about 7%, about 6%, about 5%, about 4%, about 3%, about 2%, or about 1% by weight based on the total weight of the mixed metal oxide component, with a lower boundary of 0%). In some embodiments, the mixed metal oxide component can be activated or stabilized. For example, in some embodiments, the vanadia/titania oxide can be activated or stabilized with tungsten (e.g. $WO_3$) to provide $V_2O_5/TiO_2/WO_3$. In some embodiments, the amount of tungsten present in the mixed metal oxide component (e.g., $V_2O_5/TiO_2/WO_3$) ranges from about 0.5% to about 10% by weight based on the total weight of the mixed metal oxide component (no more than about 10%, about 9%, about 8%, about 7%, about 6%, about 5%, about 4%, about 3%, about 2%, or about 1% by weight based on the total weight of the mixed metal oxide component, with a lower boundary of 0%). In some embodiments, the vanadia is activated or stabilized with tungsten (e.g., $WO_3$). The tungsten can be dispersed at concentrations ranging from about 0.5% to about 10% by weight based on the total weight of vanadia (no more than about 10%, about 9%, about 8%, about 7%, about 6%, about 5%, about 4%, about 3%, about 2%, or about 1% by weight based on the total weight of vanadia, with a lower boundary of 0%). For examples of mixed metal oxides as SCR materials see U.S. Pat. Appl. Pub. No. 2001/0049339 to Schafer-Sindelindger et al.; and U.S. Pat. No. 4,518,710 to Brennan et al.; U.S. Pat. No. 5,137,855 to Hegedus et al.; U.S. Pat. No. 5,476,828 to Kapteijn et al.; U.S. Pat. No. 8,685,882 to Hong et al.; and U.S. Pat. No. 9,101,908 to Jurng et al., which are all incorporated by references herein in their entireties.

For SCR materials comprising a metal promoted molecular sieve, the term "promoted" generally refers to a molecular sieve as described above comprising one or more components that are intentionally added, as opposed to comprising impurities that may be inherent in the molecular sieve. Thus, a promoter is a component that is intentionally added to enhance the activity of a catalyst, compared to a catalyst that does not have promoter intentionally added. In order to promote the SCR of oxides of nitrogen, in one or more embodiments according to the present disclosure, a suitable metal is exchanged into the molecular sieves. Copper participates in the conversion of nitrogen oxides and thus may be a particularly useful metal for exchange. Accordingly, in particular embodiments, a catalyst composition is provided which comprises a copper-promoted molecular sieve, e.g., Cu-CHA. However, the invention is not intended to be limited thereto, and catalyst compositions comprising other metal-promoted molecular sieves are also encompassed hereby.

Promoter metals can generally be selected from the group consisting of alkali metals, alkaline earth metals, transition metals in Groups IIIB, IVB, VB, VIB, VIIB, VIIIB, IB, and IIB, Group IIIA elements, Group IVA elements, lanthanides, actinides, and combinations thereof. Further promoter metals that can, in various embodiments, be used to prepare metal-promoted molecular sieves include, but are not limited to, copper (Cu), cobalt (Co), nickel (Ni), lanthanum (La), manganese (Mn), iron (Fe), vanadium (V), silver (Ag), cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), tungsten (W), and combinations thereof. Combinations of such metals can be employed, e.g., copper and iron, giving a mixed Cu—Fe-promoted molecular sieve, e.g., Cu—Fe-CHA.

The promoter metal content of a metal-promoted molecular sieve, calculated as the oxide, in one or more embodiments, ranges from about 0.1 wt. % to about 10 wt. %, from about 0.1 wt. % to about 5 wt. %, from about 0.5 wt. % to about 4 wt. %, from about 2 wt. % to about 5 wt. %, or from about 1 wt. % to about 3 wt. % based on the total weight of the calcined molecular sieve (including promoter) and reported on a volatile-free basis. In some embodiments, the promoter metal of the molecular sieve comprises Cu, Fe, or a combination thereof.

For examples of SCR materials comprising metal-promoted molecular sieves, see U.S. Pat. No. 9,480,976 to Rivas-Cardona et al.; U.S. Pat. No. 9,352,307 to Stiebels et al.; U.S. Pat. No. 9,321,009 to Wan et al.; U.S. Pat. No. 9,199,195 to Andersen et al.; U.S. Pat. No. 9,138,732 to Bull et al.; U.S. Pat. No. 9,011,807 to Mohanan et al.; U.S. Pat. No. 8,715,618 to Turkhan et al.; U.S. Pat. No. 8,293,182 to Boorse et al.; U.S. Pat. No. 8,119,088 to Boorse et al.; U.S. Pat. No. 8,101,146 to Fedeyko et al.; and U.S. Pat. No. 7,220,692 to Marshall et al., which are all incorporated by reference herein in their entireties.

Catalytic Article

The substrate of the catalytic articles disclosed herein may be constructed of any material typically used for preparing automotive catalysts and typically comprises a metal or ceramic monolithic honeycomb structure, such as a wall-flow substrate. The substrate for the selective oxidation catalyst disclosed herein is a wall-flow filter, which typically provides a plurality of wall surfaces upon which washcoats comprising the catalyst compositions described herein are applied and adhered, thereby acting as a carrier for the catalyst compositions.

Exemplary wall-flow filter metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface of the wall-flow metal substrate may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the wall-flow substrate may include any suitable refractory material, e.g., cordierite, mullite, cordierite-α alumina, silicon carbide, silicon nitride, zircon mullite, spodumene, alumina-silica magnesia, zircon silicate, sillimanite, magnesium silicates, zircon, petalite, a alumina, aluminosilicates and the like.

The wall-flow substrate employed may have a plurality of fine, parallel gas flow passages extending along the longitudinal axis of the substrate. Each passage in the wall-flow filter substrate is, typically, blocked at one end of the substrate body with a non-porous plug, with alternate passages blocked at opposite end-faces. This requires that gas flow through the porous walls of the wall-flow filter substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow filter substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates. However, it will be understood that the invention is not limited to a particular substrate type, material, or geometry. Note that in wall-flow substrates, the catalyst composition can permeate into the pore structure of the porous walls (i.e., partially or fully occluding the pore openings) in addition to being disposed on the surface of the walls in a wall-flow substrate.

Figure 2:
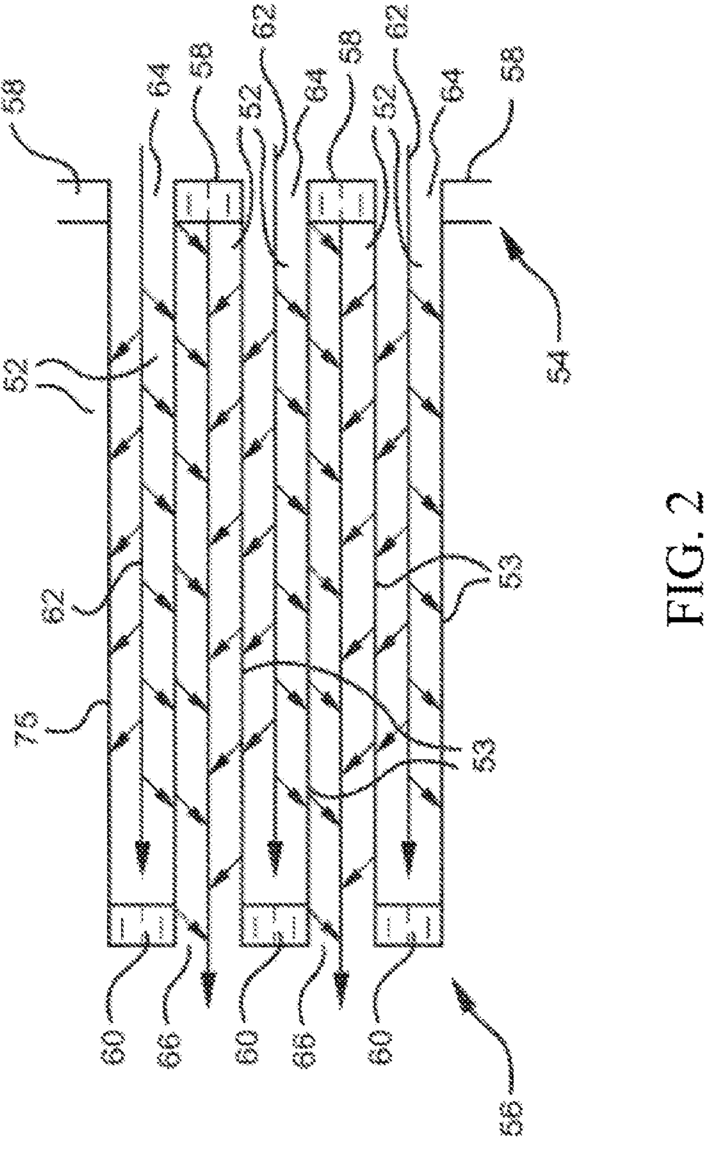
FIG. 2 is a cutaway view of a section enlarged relative to FIG. 1 and taken along a plane parallel to the end faces of the substrate of FIG. 1, which shows an enlarged view of a plurality of the gas flow passages shown in FIG. 1.

FIGS. 1 and 2 illustrate an exemplary substrate 30 in the form of a wall-flow filter substrate having a cylindrical shape with a plurality of gas flow passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of the walls because of inlet plugs 58. The porous wall-flow filter used in this invention is catalyzed in that the wall of said element has thereon or contained therein one or more catalytic materials. Catalytic materials (e.g., selective oxidation catalyst composition and optional SCR materials) may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element. Examples of wall-flow filters having one catalytic material disposed thereon, include but are not limited to, wall-flow filters with a selective oxidation catalyst composition of the invention disposed thereon, using one or more layers to render the catalyzed soot filter of the invention. In some embodiments, the only catalytic material on the filter is only the selective oxidation catalyst composition.

Figure 3:
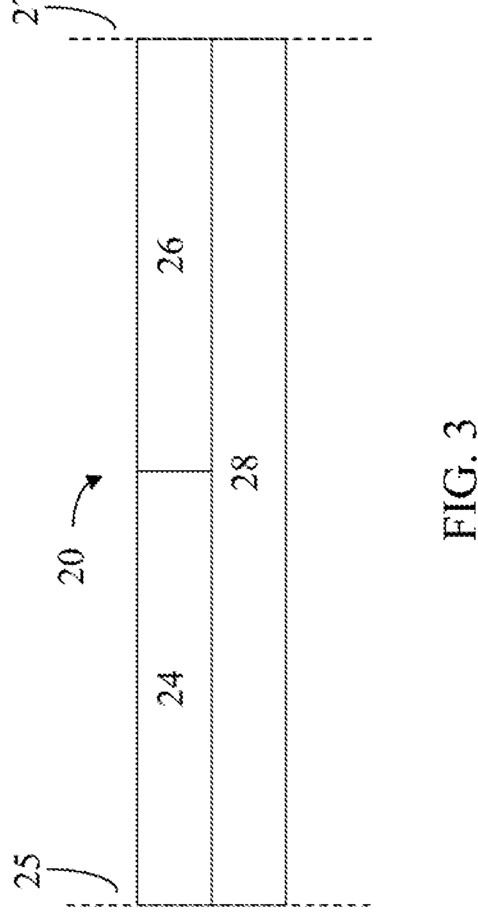
FIG. 3 shows a cross-sectional view of a zoned catalyzed soot filter.

In some embodiments, the catalytic material on the filter of the CSF disclosed herein comprises two or more catalyst compositions (e.g., the selective oxidation catalyst composition and SCR material), wherein the catalyst compositions are different. Such catalyst compositions are contained in separate washcoat slurries when coating the wall-flow filter, e.g., in an axially zoned configuration, wherein the wall-flow filter is coated with a washcoat slurry of one catalyst composition and a washcoat slurry of another catalyst composition. This may be more easily understood by reference to FIG. 3, which shows an embodiment of a zoned coated wall-flow filter 20 in which the first washcoat zone 24 and the second washcoat zone 26 are located side by side along the length of the substrate 28, which has an upstream end 25 and a downstream end 27. In this zoned configuration, the first washcoat zone 24 is located upstream of the second washcoat zone 26 (or the second washcoat zone 26 is located downstream of the first washcoat zone 24).

For example, in some embodiments, the catalytic material of the catalyzed soot filter comprises a selective oxidation catalyst composition and a second SCR material, which are disposed on the substrate in an axially zoned configuration. In some embodiments, the washcoat zone 24 represents the selective oxidation catalyst composition disclosed herein and the second washcoat zone 26 represents the second SCR material disclosed herein to render a catalyzed soot filter, wherein the second SCR material is disposed downstream of the selective oxidation catalyst composition. In another embodiment, the first washcoat zone 24 represents the second SCR material disclosed herein and the second washcoat zone 26 represents the selective oxidation catalyst composition disclosed herein, providing a catalyzed soot filter, wherein the selective oxidation catalyst composition is disposed downstream of the second SCR material.

In another example, the catalytic material of the catalyzed soot filter comprises a selective oxidation catalyst composition and a second SCR material mixed in the same washcoat and disposed on the substrate in a layered configuration.

In describing the quantity of washcoat or catalytic metal components or other components of the composition, it is convenient to use units of weight of component per unit volume of catalyst substrate. Therefore, the units, grams per cubic inch ("$g/in^3$") and grams per cubic foot ("$g/ft^3$") are used herein to mean the weight of a component per volume of the substrate, including the volume of void spaces of the substrate. Other units of weight per volume such as g/L are also sometimes used. The loading of supported active metal on the catalytic article is typically from about 0.1 to about 6 $g/in^3$, more typically from about 0.1 to about 5 $g/in^3$, 0.1 to about 1 $g/in^3$, or from about 0.1 to about 0.5 $g/in^3$. In the presently disclosed articles, these values reflect the loading of the individual active metal (e.g., PGM component, base metal oxide component, and/or rare earth metal oxide component), taking into account the weight of the active metal and the weight of the support. The total loading of the active metal without support material on the catalytic article is typically in the range from about 0.1 to about 200 $g/ft^3$, from about 0.1 to about 100 $g/ft^3$, about 0.1 to about 10 $g/ft^3$, from about 0.1 to about 5 $g/ft^3$, or from about 0.1 to about 0.5 $g/ft^3$ for each layer. Such values are understood in the context of the present disclosure to include, e.g., the PGM component (s), base metal oxide component(s), rare earth metal oxide component(s) in the disclosed selective oxidation catalyst composition and SCR materials, taking into account the weight of the metal(s) but not the weight of the support. It is noted that these weights per unit volume are typically calculated by weighing the catalyst substrate before and after treatment with the corresponding catalyst washcoat composition, and since the treatment process involves drying and calcining the catalyst substrate at high temperature, these weights represent an essentially solvent-free catalyst coating as essentially all of the water of the washcoat slurry has been removed.

Method of Making the Catalyst Compositions

Preparation of base metal oxide component-impregnated support materials, PGM component-impregnated support materials, or rare earth metal oxide component-impregnated support materials generally comprises impregnating a support material in particulate form with an active metal precursor solution (e.g., a copper-containing precursor, a palladium component precursor, or a cerium-containing precursor, respectively). The active metal precursor is generally a salt of the active metal and is typically dissolved in a solvent to form an active metal precursor solution.

Exemplary base metal oxide component precursors include, but are not limited to, copper precursors selected from copper nitrate, copper chloride, copper perchlorate, copper bromide, copper sulfate, and combinations thereof. Exemplary PGM component precursors include, but are not limited to, palladium component precursors selected from palladium nitrate, palladium tetra amine, palladium acetate, and combinations thereof. Exemplary base metal oxide component precursors include, but are not limited to, copper nitrate, copper chloride, copper perchlorate, copper bromide, copper sulfate, or combinations thereof. Exemplary rare earth metal oxide component precursors include, but are not limited to, cerium component precursors selected from cerium nitrate, cerium chloride, cerium bromide, cerium sulfate, or combinations thereof. Preparation of the metal oxide component-impregnated support materials can be done, e.g., using incipient wetness techniques as described in more detail below.

Incipient wetness impregnation techniques, also called capillary impregnation or dry impregnation, are commonly used for the synthesis of heterogeneous materials, i.e., catalysts. Typically, a metal precursor is dissolved in an aqueous or organic solution and then the metal-containing solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower. The catalyst can then be dried and calcined to remove the volatile components within the solution, depositing the metal on the surface of the catalyst support. The concentration profile of the impregnated material depends on the mass transfer conditions within the pores during impregnation and drying.

The support material is typically dry enough to absorb substantially all of the solution to form a moist solid. Aqueous solutions of water soluble compounds or complexes of the active metal can be utilized, such as palladium nitrate, cerium nitrate, or copper nitrate.

Following treatment of the support material with the active metal precursor solution, the particles are dried, such as by heat treating the particles at elevated temperature (e.g., 100-150° C.) for a period of time (e.g., 1-3 hours), and then calcined to convert the active metal to a more catalytically active form. An exemplary calcination process involves heat treatment in air at a temperature of about 400-550° C. for 10 min to 3 hours. The above process can be repeated as needed to reach the desired level of active metal impregnation. For example, in some embodiments, a palladium component is impregnated onto a refractory metal oxide support material (e.g., alumina-silica) using palladium nitrate as a PGM component precursor. In another example, a palladium component is impregnated onto an oxygen storage component (e.g. ceria) using palladium nitrate as a PGM component precursor. In some embodiments, copper is impregnated onto an oxygen storage component (e.g., ceria) using copper nitrate as a base metal oxide component precursor. In further embodiments, cerium is impregnated onto an oxygen storage component (e.g. ceria) using cerium nitrate as a rare earth metal oxide component precursor. For additional examples of the preparation of selective oxidation catalyst compositions, see, U.S. Pat. No. 8,858,904 to Punke et al.; U.S. Pat. No. 8,802,016 to Grubert et al.; U.S. Pat. No. 8,524,182 to Grubert et al.; and U.S. Pat. No. 8,038,954 to Li et al., which are all incorporated by reference herein in their entireties.

Preparation of metal-promoted molecular sieves for SCR materials included within various embodiments disclosed herein generally comprises ion-exchanging one or more metals (e.g., copper) into molecular sieves. The ion-exchange process generally comprises contacting the molecular sieves in particulate form with a metal precursor solution. For example, a copper salt can be used to provide copper. Typically, alkali metal molecular sieves or $NH_4$ molecular sieves are used for ion-exchanging one or more metals. For metal-promoted molecular sieves comprising two or more metals, ion-exchanging of the metals into the molecular sieve can be carried out at the same time or separately. For example, copper precursors in combination with one or more other metals precursors can be employed. In certain embodiments, the method comprises exchanging the second metal into a molecular sieve that has first been promoted with the first metal (e.g., exchanging a second metal into a copper-promoted molecular sieve material). For examples of the preparation of SCR materials comprising metal-promoted molecular sieves, see U.S. Pat. No. 9,480,976 to Rivas-Cardona et al.; U.S. Pat. No. 9,352,307 to Stiebels et al.; U.S. Pat. No. 9,321,009 to Wan et al.; U.S. Pat. No. 9,199,195 to Andersen et al.; U.S. Pat. No. 9,138,732 to Bull et al.; U.S. Pat. No. 9,011,807 to Mohanan et al.; U.S. Pat. No. 8,715,618 to Turkhan et al.; U.S. Pat. No. 8,293,182 to Boorse et al.; U.S. Pat. No. 8,119,088 to Boorse et al.; U.S. Pat. No. 8,101,146 to Fedeyko et al.; and U.S. Pat. No. 7,220,692 to Marshall et al., which are all incorporated by reference herein in their entireties. In particular, for examples of the preparation of SCR materials comprising copper and/or iron promoted chabazite zeolites, see U.S. Pat. No. 9,352,307 Stiebels et al.; U.S. Pat. No. 9,162,218 to Bull et al.; U.S. Pat. No. 8,821,820 to Seyler et al.; U.S. Pat. No. 8,404,203 to Bull et al.; U.S. Pat. No. 8,293,199 to Beutel et al.; U.S. Pat. No. 7,601,662 to Bull et al.; U.S. Patent Application Publication Nos. 2015/0231620 to Montreuil et al.; 2011/0165051 to Beutel et al.; 2010/0092362 to Li et al.; and International Patent Application Nos. 2010/054034 to Bull et al.; and 2009/141324 to Turkhan et al. which are all incorporated by reference herein in their entireties. For the preparation of SCR materials comprising mixed metal oxides see, for example, U.S. Pat. No. 4,518,710 to Brennan et al.; U.S. Pat. No. 5,137,855 to Hegedus et al.; U.S. Pat. No. 5,476,828 to Kapteijn et al.; U.S. Pat. No. 8,685,882 to Hong et al.; and U.S. Pat. No. 9,101,908 to Jurng et al., which are all incorporated by reference herein in their entireties.

Substrate Coating Process

The disclosed catalyst compositions are typically prepared in the form of catalyst particles as noted above. These catalyst particles can be mixed with water to form a slurry for purposes of coating a catalyst substrate, such as a honeycomb-type substrate. In some embodiments, one or more of the catalyst compositions can be present in the same slurry. For example, in some embodiments, the slurry comprises a selective oxidation catalyst composition and a SCR material.

In addition to the catalyst particles, the slurry may optionally contain a binder in the form of alumina, silica, Zr acetate, colloidal zirconia, or Zr hydroxide, associative thickeners, and/or surfactants (including anionic, cationic, non-ionic or amphoteric surfactants). Other exemplary binders include bohemite, gamma-alumina, or delta/theta alumina, as well as silica sol. When present, the binder is typically used in an amount of about 1-5 wt. % of the total washcoat loading.

Addition of acidic or basic species to the slurry can be carried out to adjust the pH accordingly. For example, in some embodiments, the pH of the slurry is adjusted by the addition of ammonium hydroxide or aqueous nitric acid. A typical pH range for the slurry is about 3 to 6.

The slurry can be milled to reduce the particle size and enhance particle mixing. The milling can be accomplished in a ball mill, continuous mill, or other similar equipment, and the solids content of the slurry may be, e.g., about 1-60 wt. %, about 5-40 wt. %, or more particularly about 5-25 wt. %. In one embodiment, the post-milling slurry is characterized by a D90 particle size of about 1 to about 40 microns, preferably 1 to about 30 microns, more preferably about 1 to about 15 microns or from about 1 to about 5 microns (or less than about 40 microns, about 30 microns, 20 microns, 10 microns, or less than about 5 microns). The D90 is determined using a dedicated particle size analyzer. The equipment was manufactured by Sympatec in 2010 and uses laser diffraction to measure particle sizes in small volume slurry. The D90, typically with units of microns, means 90% of the particles by number have a diameter less than a quoted value.

The slurry is coated on the substrate using any washcoat technique known in the art. In one embodiment, the substrate is dipped one or more times in the slurry or otherwise coated with the slurry. Thereafter, the coated substrate is dried at an elevated temperature (e.g., 100-150° C.) for a period of time (e.g., 10 min to about 3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

Emission Treatment System

The present invention also provides an emission treatment system that incorporates the catalytic article(s) described herein. Typically integrated emissions treatment system comprise one or more catalytic articles/components for the treatment of exhaust gas emissions, e.g., exhaust gas emissions from a diesel engine. For example, the emission treatment system may further comprise a diesel oxidation (DOC) catalyst and a selective catalytic reduction (SCR) catalyst and/or, optionally, a selective catalytic reduction/ammonia oxidation (SCR/AMOx) catalyst, in addition to the CSF (comprising a selective oxidation catalyst on a filter) described herein. The CSF is typically located downstream from the DOC, although the relative placement of the various components of the emission treatment system can be varied. The emission treatment system can further include components such as a reductant injector for ammonia precursor, a hydrocarbon injector for diesel fuel, additional particulate filtration components, and/or $NO_x$ storage and/or trapping components. The preceding list of components is merely illustrative and should not be taken as limiting the scope of the invention.

Figure 4:
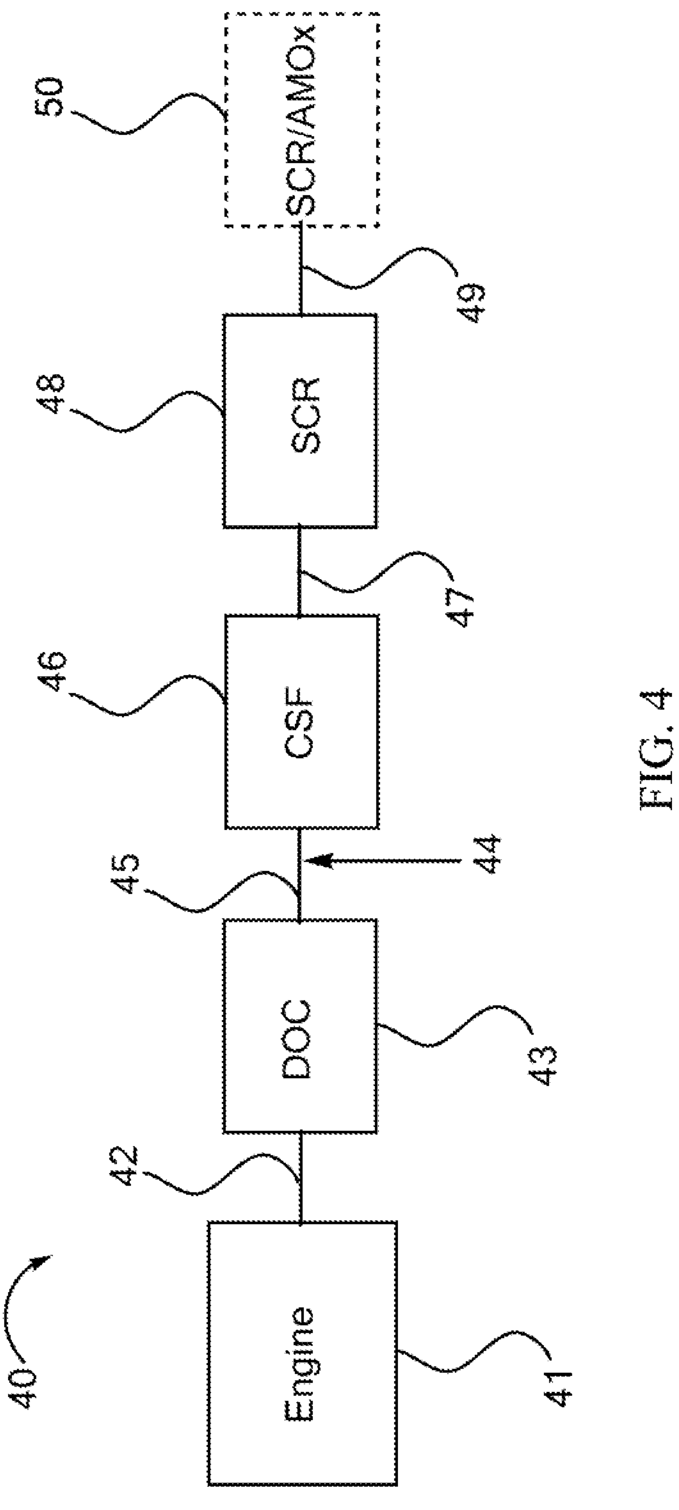
FIG. 4 shows a schematic depiction of an embodiment of an exhaust gas treatment system as disclosed herein.

One exemplary emission treatment system is illustrated in FIG. 4, which is a schematic representation of an emission treatment system 40. As shown, an exhaust gas stream containing gaseous pollutants and particulate matter is conveyed via exhaust pipe 42 from an engine 41 to a diesel oxidation catalyst (DOC) 43 to a CSF 46 as disclosed herein to a selective catalytic reduction (SCR) catalyst 48 and optionally to a selective catalytic reduction/ammonia oxidation (SCR/AMOx) catalyst 50.

In the DOC 43, unburned gaseous and non-volatile hydrocarbons and carbon monoxide are largely combusted to form carbon dioxide and water. In addition, a portion of the NO of the $NO_x$ component may be oxidized to $NO_2$ in the DOC.

The exhaust gas stream is next conveyed via exhaust pipe 45 to the CSF 46 disclosed herein, which is a catalyzed soot filter comprising a selective oxidation catalyst on a filter. CSF 46 traps any particulate matter present in the exhaust gas stream before before the exhaust gas stream reaches the SCR catalyst 48 located further downstream. An injector 44 for introducing a nitrogenous reducing agent into the exhaust stream is advantageously located upstream of CSF 46. The reducing agent promotes the reduction of the $NO_x$ to $N_2$ and water as the gas passes through CSF 46 and is exposed to the optional SCR material in CSF 46 and SCR catalyst 48. In general, a nitrogenous reducing agent broadly covers any compound that promotes the reduction of $NO_x$ in an exhaust gas. Examples of such reductants include ammonia, hydrazine or any suitable ammonia precursor such as urea ($(NH_2)_2CO$), ammonium carbonate, ammonium carbamate, ammonium hydrogen carbonate or ammonium formate. After removal of particulate matter via CSF 46, the exhaust gas stream is conveyed via exhaust pipe 47 to a downstream SCR catalyst 48 for further treatment and/or conversion of $NO_x$. The exhaust gas stream exiting SCR catalyst 48 can then optionally be conveyed via exhaust pipe 49 to a selective catalytic reduction/ammonia oxidation (SCR/AMOx) catalyst 50 before finally exiting the engine exhaust gas treatment system 40. As noted herein, the CSF 46 can optionally comprise a second SCR material and in such cases, some SCR can be achieved on the filter (before the exhaust gas stream reaches the SCR catalyst 48).

By including the injector 44 upstream of CSF 46 in the exhaust gas treatment system, a more compact engine treatment system is provided. The presence of the reductant at this upstream location (upstream of a CSF) is made possible by using a selective oxidation catalyst composition on the filter of CSF 46 adapted for oxidizing HCs preferentially as opposed to the reductant, e.g., ammonia. As such, advantageously there is no significant decrease in the concentration of ammonia in the exhaust gas stream across the CSF and a suitable amount of the reductant is retained in the exhaust gas stream for NOx conversion by downstream SCR catalyst 48. Although the systems are described here, as comprising an SCR component independent of the CSF, in certain embodiments, the SCR component and the CSF can be combined as a single article. As such, CSF 46 can comprise both the selective oxidation catalyst component and the first SCR material, e.g., in a zoned configuration as described above with respect to the selective oxidation catalyst composition and the first SCR material. In such system embodiments, separate SCR catalyst 48 is not present.

The present disclosure also provides a method for at least partially reducing HC, CO, and $NO_x$ in an exhaust gas stream, comprising routing the gas stream through the system described herein for a time and temperature sufficient to reduce HCs, CO, and $NO_x$ in the exhaust gas stream. For example, in some embodiments, the method comprises contacting the exhaust gas stream with a diesel oxidation catalyst adapted for the oxidation of HCs and CO, thereby forming a first effluent with reduced levels of HCs and CO; injecting a reductant into the first effluent to obtain a second effluent; contacting the second effluent with a catalyzed soot filter (CSF) as disclosed herein, forming a third effluent with further reduced levels of HCs; and contacting the third effluent with a SCR material adapted for the oxidation of $NO_x$, thereby forming a treated exhaust gas stream with reduced levels of HCs, CO, and $NO_x$. In some embodiments, the treated exhaust gas stream has a HC content that is reduced by at least about 25%, about 35%, about 45%, about 55%, about 65%, about 75%, about 85%, or at least about 95% with respect to the exhaust gas stream at a temperature ranging from about 400 to about 600° C. (or about 450° C., about 500° C., or about 550° C.). For example, in some embodiments, the treated exhaust gas stream has a HC content that is reduced by at least 35% at 450° C. with respect to the exhaust gas stream entering the system. In another embodiment, the treated exhaust gas stream has a HC content that is reduced by at least 55% at 500° C. with respect to the exhaust gas stream prior to treatment. In another embodiment, the treated exhaust gas stream has a HC content that is reduced by at least 75% at 550° C. with respect to the exhaust gas stream prior to treatment. In some embodiments, the treated exhaust stream has a CO content that is reduced by at least about 25%, about 35%, about 45%, about 55%, about 65%, about 75%, about 85%, or at least about 95% with respect to the exhaust gas stream at a temperature ranging from about 400 to about 600° C. (or about 450° C., about 500° C., or about 550° C.). In some embodiments, the treated exhaust stream has a NO, content that is reduced by at least about 25%, about 35%, about 45%, about 55%, about 65%, about 75%, about 85%, or at least about 95% with respect to the exhaust gas stream at a temperature ranging from about 400 to about 600° C. (or about 450° C., about 500° C., or about 550° C.).

EXPERIMENTAL

Aspects of the present invention are more fully illustrated by the following examples, which are set forth to illustrate certain aspects of the present invention and are not to be construed as limiting thereof.

Example 1

General Procedure for the Preparation of Catalytic Sample Articles 1-8.

Catalytic sample articles 1 to 8 are catalyst-coated filter samples. The filter substrate is a cordierite wall-flow filter with a porosity of 58%, a mean pore size of 13 μm, cell density of 300/in$^2$ and a wall thickness of 0.3 mm. Round sample cores with 1" (diameter)×3" (length) were used for the experiment. Catalyst slurries consisting of variable catalytically active components dispersed in deionized water were used. Each slurry was milled to 90% of the particles having a size less than 5 μm ($D_{90}$<5 μm), and the slurry was adjusted to the appropriate solid content before coating. The slurry was washcoated onto the filter substrate by immersing the substrate into the slurry with the inlet end of the substrate down into and the outlet end just above (about ¼ inch) the slurry level. The substrate was pulled out of the slurry, and a stream of air was blown from the outlet side of the channels until no washcoat slurry was coming out from the inlet side. The coated sample was then dried at 110° C. for 2 h and calcined in air at 450° C. for 1 h. Specific compositions for the samples thus obtained are detailed below.

Preparation of Catalytic Sample Article 1

Catalytic sample article 1 was prepared according to the general procedure described above, wherein the slurry contained Cu-Chabazite (prepared according to procedures known in the art. See, for example, U.S. Pat. No. 7,601,662, which is herein incorporated by reference in its entirety) with a slurry solid content of 23%. The washcoat loading of Cu-Chabazite was 0.6 g/in$^3$.

Preparation of Catalytic Sample Article 2

Catalytic sample article 2 contains a mixture of Pd/$SiO_2$—$Al_2O_3$ with a washcoat loading of 0.1 g/in$^2$ and Cu-chabazite with a washcoat loading of 0.1 g/in$^3$. Pd/$SiO_2$—$Al_2O_3$ was made by impregnating Pd nitrate onto a $SiO_2$—$Al_2O_3$ support (5% $SiO_2$) using an incipient wetness technique. The impregnated powder was dried at 110° C. for 2 h and then calcined at 500° C. for 2 h. The Pd powder was milled to $D_{90}$<5 μm before mixing with a slurry containing Cu-chabazite to obtain a solid content of 17%. Catalytic sample article 2 was prepared according to the general procedure described above with the prepared Pd/$SiO_2$-$Al_2O_3$/Cu-chabazite slurry to obtain catalytic sample article 2 with a palladium loading of 1 g/ft$^3$.

Preparation of Catalytic Sample Article 3

Catalytic sample article 3, containing Pd/Cu-chabazite with a washcoat loading of 0.6 g/in$^3$, was prepared according to the general procedure described above. The slurry was prepared by direct addition of Pd nitrate to a slurry of Cu-Chabazite to obtain a Pd/Cu-chabazite slurry with a solid content of 23%.

Preparation of Catalytic Sample Article 4

Catalytic sample article 4 contains Pd/$SiO_2$—$Al_2O_3$ with a washcoat loading of 0.8 g/in$^3$. $SiO_2$—$Al_2O_3$ support material was jet milled to $D_{90}$<5 μm as dry powder prior to Pd deposition. The milled support was dispersed in deionized water at 30-40% solid. To this slurry, Pd nitrate was slowly added. The slurry was further diluted to obtain a final solid content of 23%. Catalytic sample article 4 was prepared according to the general procedure described above with the prepared Pd/$SiO_2$—$Al_2O_3$ slurry to obtain catalytic sample article 4 with a palladium loading of 3 g/ft$^3$.

Preparation of Catalytic Sample Article 5

A slurry containing $CeO_2$/$ZrO_2$ (30% $ZrO_2$ content) was prepared with a solid content of 7%. Catalytic sample article 5 was prepared according to the general procedure described above with the prepared $CeO_2$/$ZrO_2$ (30% $ZrO_2$ content) slurry to obtain catalytic sample article 5 with a washcoat loading of 0.25 g/in$^3$.

Preparation of Catalytic Sample Article 6

A slurry containing $CeO_2$ with a solid content of 7% was prepared. Catalytic sample article 6 was prepared according to the general procedure described above with the prepared $CeO_2$ slurry to obtain catalytic sample article 6 with a washcoat loading of 0.25 g/in$^3$.

Preparation of Catalytic Sample Article 7

Catalytic sample article 7 contains 10% CuO-5% $CeO_2$/$CeO_2$ with a washcoat loading of 0.25 g/in$^3$. 10% CuO-5% $CeO_2$/$CeO_2$ was prepared by co-impregnation of Cu nitrate and Ce nitrate on a $CeO_2$ support. The impregnated powder was dried at 110° C. for 2 h and then calcined at 450° C. for 1 h. A slurry was prepared with a slurry solid content of 5%. Catalytic sample article 7 was prepared according to the general procedure described above with the prepared 10% CuO-5% $CeO_2$/$CeO_2$ slurry to obtain catalytic sample article 7.

Preparation of Catalytic Sample Article 8

Catalytic sample article 8 contains Pd/$CeO_2$ with a washcoat loading of 0.25 g/in$^3$. Pd/$CeO_2$ was made by impregnating Pd nitrate onto a ceria support using an incipient wetness technique and was used to prepare a slurry with a solid content of 7%. Catalytic sample article 8 was prepared according to the general procedure described above with the prepared Pd/$CeO_2$ slurry to obtain catalytic sample article 8 with a palladium loading of 1 g/ft$^3$.

Evaluation of Catalytic Sample Articles 1-8

Catalytic sample articles 1-8 were exposed to hydrothermal aging at 650° C. for 25 h with 10% steam in air and then their catalytic activity toward THC conversion and ammonia conversion was measured following the procedure described below.

The activity test was conducted in a lab reactor with a feed containing 1000 ppm $NH_3$, 1000 ppm decane ($C_1$ basis), 1000 ppm NO, 5% $H_2O$, 5% $CO_2$, 10% $O_2$ and balance $N_2$. The gas hourly space velocity of the feed gas was 50,000 $h^{-1}$. Catalytic sample articles 1-8 were evaluated at 550, 500 and 450° C. under steady-state conditions for their conversion of THC and ammonia, and the concentrations of the gaseous components were determined using an in-stream FTIR instrument (see Tables 1-3).

TABLE 1

Catalyst performance at 550° C.

| Sample # | THC (% conversion) | $NH_3$ (% conversion) | $NO_x$ (% conversion) |
|---|---|---|---|
| 1 | 4 | 79 | 53 |
| 2 | 39 | 90 | 50 |
| 3 | 23 | 97 | 65 |
| 4 | 100 | 100 | −59 |
| 5 | 47 | 73 | −48 |
| 6 | 39 | 42 | −27 |
| 7 | 97 | 100 | −87 |
| 8 | 78 | 69 | −46 |

TABLE 2

Catalyst performance at 500° C.

| Sample # | THC (% conversion) | $NH_3$ (% conversion) | $NO_x$ (% conversion) |
|---|---|---|---|
| 1 | 7 | 77 | 60 |
| 2 | 35 | 88 | 58 |
| 3 | 22 | 96 | 73 |
| 4 | 100 | 100 | −50 |
| 5 | 27 | 40 | −19 |
| 6 | 21 | 19 | −8 |
| 7 | 93 | 98 | −75 |
| 8 | 57 | 34 | −20 |

TABLE 3

Catalyst performance at 450° C.

| Sample # | THC (% conversion) | $NH_3$ (% conversion) | $NO_x$ (% conversion) |
|---|---|---|---|
| 1 | 8 | 75 | 62 |
| 2 | 23 | 83 | 63 |
| 3 | 17 | 93 | 77 |
| 4 | 94 | 99 | −46 |
| 5 | 15 | 19 | −4 |
| 6 | 11 | 10 | −3 |
| 7 | 76 | 79 | −51 |
| 8 | 39 | 20 | −9 |

Figure 5:
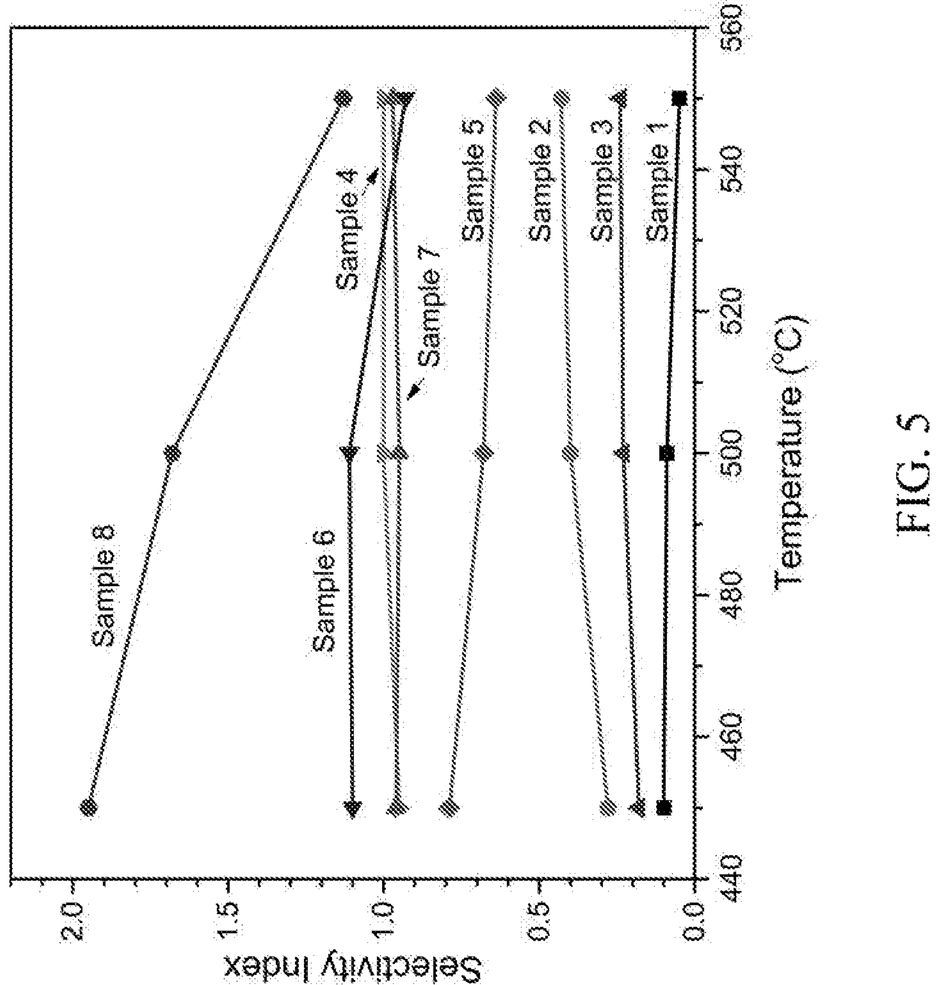
FIG. 5 is a line graph showing the selectivity index of catalytic sample articles 1-8 over a temperature range from about 440° C. to 560° C., wherein the selectivity index is defined as the ratio of total hydrocarbon (THC) conversion to ammonia ($NH_3$) conversion.

Tables 1 to 3 summaries the conversions of THC, $NH_3$ and $NO_x$ at 550, 500 and 450° C., respectively. FIG. 5 shows the selectivity index for Samples 1 to 8 as a function of reaction temperature. The selectivity index is defined as the ratio of THC conversion to $NH_3$ conversion. The higher this selectivity index on a catalyst, the more selective it is towards THC oxidation. The selectivity index as shown in FIG. 5 follows the following order: Sample 8>>Sample 6~Sample 4~Sample 7>Sample 5>Sample 2>Sample 3>Sample 1.

Pt is known to be much more active for $NH_3$ oxidation than Pd. See, for example, Y. Li and J. N. Armor, Appl. Catal. B: Environmental, 13 (1997) 131-139, which is herein incorporated by reference in its entirety, showing that on a $Pt/Al_2O_3$ catalyst the $NH_3$ conversion is >90% when the reaction temperature is higher than 200° C., producing mostly $N_2O$ as the oxidation product. Sample 8 in this invention contains a small amount of Pd on $CeO_2$ support (equivalent to 0.2% by weight on a powder basis). Without intending to be bound by theory, it is thought that the combination of low level of Pd and the active oxygen-containing support allows the catalyst to oxidize THC while minimizing $NH_3$ oxidation.

That which is claimed:

1. A catalyzed soot filter (CSF) comprising a selective oxidation catalyst composition on a filter, wherein the selective oxidation catalyst composition has a selectivity for oxidizing HC versus oxidizing ammonia, wherein the selective oxidation catalyst composition is substantially free of platinum, wherein the selectivity is defined by a ratio of HC oxidation to ammonia oxidation of at least 0.6 at a temperature of about 450° C. to about 550° C., wherein the selective oxidation catalyst composition comprises a base metal oxide component comprising copper oxide impregnated on a ceria support, wherein the selective oxidation catalyst composition comprises palladium as a PGM component and has a loading on the filter of 0.1 $g/ft^3$ to 10 $g/ft^3$;

and wherein particles of the selective oxidation catalyst have an average particle size D90 from 1 μm to 5 μm.

2. The CSF of claim 1, wherein the selective oxidation catalyst composition has a loading of 0.1 $g/in^3$ to 0.5 $g/in^3$ on the filter.

3. A catalyzed soot filter (CSF) comprising a selective oxidation catalyst composition on a filter, wherein the selective oxidation catalyst composition has a selectivity for oxidizing HC versus oxidizing ammonia, wherein the selective oxidation catalyst composition is substantially free of platinum, wherein the selectivity is defined by a ratio of HC oxidation to ammonia oxidation of at least 0.6 at a temperature of about 450° C. to about 550° C., wherein the selective oxidation catalyst composition comprises a base metal oxide component comprising copper oxide impregnated on a ceria support, and wherein particles of the selective oxidation catalyst have an average particle size D90 from 1 μm to 5 μm.

* * * * *